United States Patent Office 3,270,208
Patented August 30, 1966

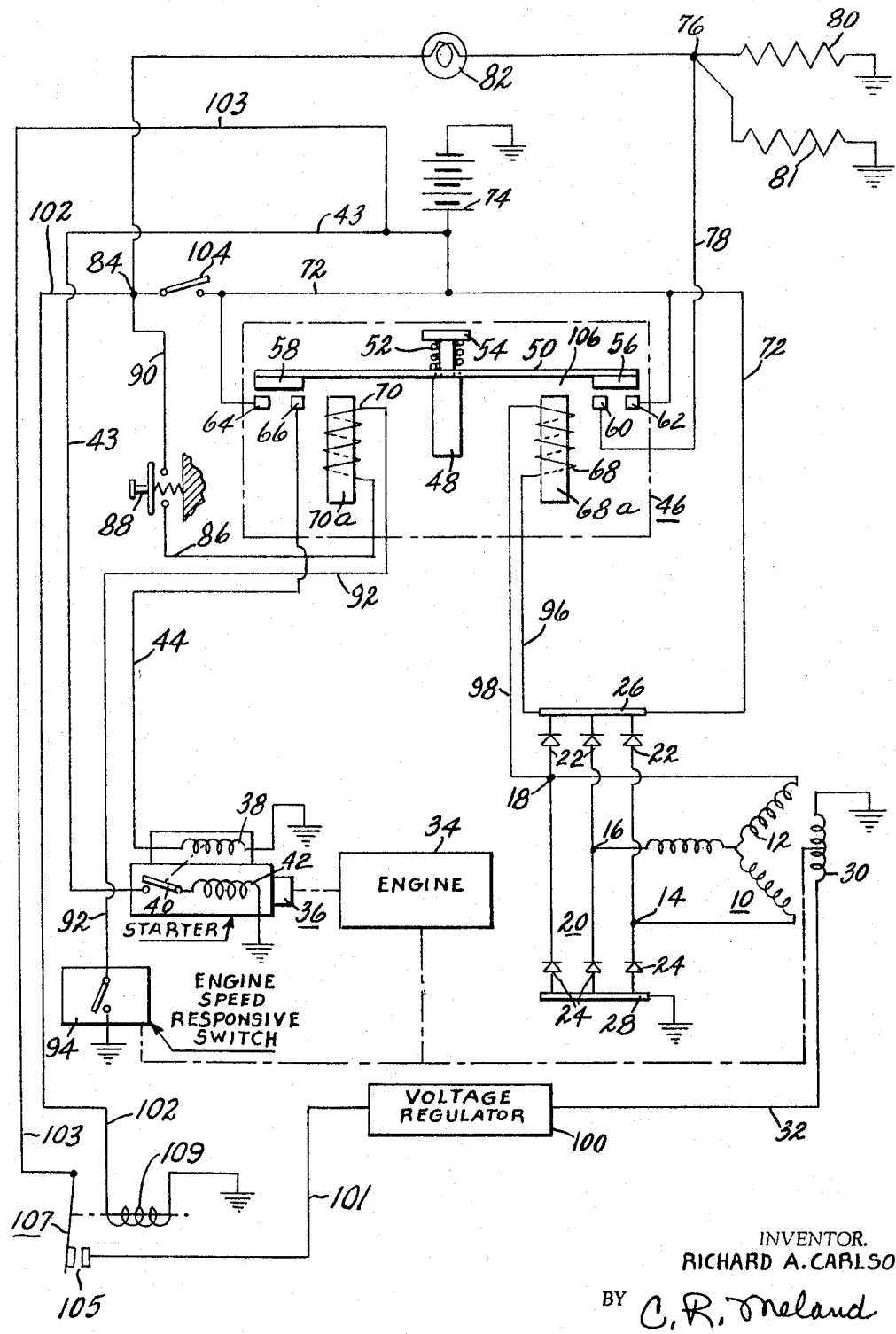

3,270,208
MOTOR VEHICLE ELECTRICAL LOAD CONTROL AND STARTING SYSTEM
Richard A. Carlson, Pontiac, Mich., assignor to General Motors Corporation, Detroit, Mich., a corporation of Delaware
Filed Sept. 5, 1963, Ser. No. 306,809
8 Claims. (Cl. 290—36)

This invention relates to electrical system for motor vehicles and more particularly to an electrical system which is capable of controlling the energization of an electric starting motor in accordance with engine speed so as to provide automatic starter deenergization and to prevent actuation of the starter when the engine is running.

One of the objects of this invention is to provide an improved electrical load control system which is capable of automatically deenergizing an electric cranking motor when the engine of a motor vehicle starts.

Still another object of this invention is to provide an electrical system for a motor vehicle which is operative to prevent actuation of the electric cranking motor when the engine is running.

A further object of this invention is to provide an electrical system for a motor vehicle which has an improved relay that is capable of controlling various electrical circuits on the motor vehicle. This relay preferably has two coil windings which are operative to attract a common armature. The armature can control various electrical circuits on the motor vehicle, one of which is the circuit to the electric cranking motor and the other of which is the circuit to certain electrical loads which are to be energized only when the generator is charging the battery. This relay is connected so that it can control a generator tell-tale lamp which indicates whether or not the generator is charging the battery.

Another object of this invention is to provide an electric system for motor vehicles that includes a diode-rectified alternator and wherein the diodes block reverse current flow from the battery and further wherein this system is provided with starter over speed protection, starter lock-out when the engine is running and means for controlling certain electrical loads on the vehicle.

Further objects and advantages of the present invention will be apparent from the following description, reference being had to the accompanying drawings wherein preferred embodiments of the present invention are clearly shown.

In the drawings:

The single figure drawing is a schematic circuit diagram of a motor vehicle electrical system made in accordance with this invention.

Referring now to the drawing, the reference numeral 10 generally designates a source of direct current power which in this case, takes the form of a diode-rectified alternating current generator. This power source includes a three phase A.C. output winding 12 which is connected with the A.C. input terminals 14, 16 and 18 of a three phase-full wave bridge rectifier network generally designated by reference numeral 20. The bridge rectifier network is made up of six diodes 22 and 24. The cathodes of the diodes 22 are all connected with a common conductor 26 which may also form a heat sink for these diodes and this common conductor 26 forms the positive D.C. output terminal for the bridge rectifier network. The anodes of the diodes 24 are connected with a common conductor 28 which may form a heat sink for the diodes 24 and which forms a common negative D.C. output terminal for the bridge rectifier network which is grounded as shown.

The generator has the usual field winding 30, one end of which is grounded and the opposite end of which is connected with conductor 32. The diodes 22, the diodes 24, the three phase winding 12 and the field winding 30 may all be built into one unit as is well known to those skilled in the art.

The engine 34 of a motor vehicle can be cranked by a conventional electric cranking motor generally designated by reference numeral 36. This cranking motor 36 is coupled to the engine 34 through the usual overrunning clutch and can be of a type wherein the pinion of a cranking motor is moved into mesh with the ring gear of the engine by a solenoid 38. The solenoid 38 can also control a switch 40 which when closed, completes a circuit to the windings 42 of the motor. One side of the switch 40 is connected with the conductor 43 which is connected to one side of battery 74. It will be appreciated by those skilled in the art that the electric cranking motor 36 can take other forms than the one illustrated and if desired, can be of a type which moves the pinion into mesh with the ring gear in response to rotation of the cranking motor shaft. In this type of cranking apparatus, no solenoid is required and energization of the motor windings also causes a meshing between the pinion and a ring gear by inertia.

The electrical system of this invention has a control relay generally designated by reference numeral 46. The control relay 46 has a fixed support 48 which supports an armature 50. The armature 50 can pivot relative to the top end of the fixed support 48 and is urged into engagement with the fixed support 48 by a spring 52 interposed between a spring retainer 54 and the armature 50. The spring retainer 54 passes through a slot formed in the armature 50 and the arrangement is such that the spring 52 normally maintains the armature 50 in its neutral position shown in the drawing.

The armature 50 carries electrical contacts 56 and 58 which cooperate respectively with the fixed contacts 60 and 62 and 64 and 66. The contacts 56 and 58 can be insulated from the armature 50 in any well-known manner and the armature 50 can pivot in a clockwise or counterclockwise direction to cause the contact 56 to connect contacts 60 and 62 or to cause the contact 58 to connect contacts 64 and 66.

The armature 50 can be moved in a clockwise direction by an electromagnet which includes the relay coil 68 and magnetic core 68a. The armature 50 can be pivoted in a counterclockwise direction by an electromagnet which includes a relay coil 70 and a magnet core 70a. It thus is seen that the control relay 46 has a common armature 50 which can be attracted by either the relay coil 68 or 70 in a manner to be more fully described.

The contact 62 of the control relay 46 is connected with a conductor 72. The conductor 72 is connected with the positive D.C. output terminal 26 of the power source 10 and is also connected to the positive side of a battery 74. The conductor 72 is further connected with the contact 64 of the control relay 46.

The contact 60 of control relay 46 is connected with junction 76 by means of a conductor 78. A resistor 80 is connected between junction 76 and ground as is an optional load 81. A generator tell-tale lamp 82 is connected between junction 76 and a junction 84.

The contact 66 of the control relay 46 is connected with conductor 44 which feeds the electric starting motor and which energizes the electric starting motor when the contact 58 connects the fixed contacts 64 and 66.

One side of the relay coil 70 is connected with conductor 86 which in turn is connected to one side of a manually operable switch 88 which is normally biased to an open position but which is closed by the operator of the motor vehicle when it is desired to crank the engine. The opposite side of switch 88 is connected with junction 84 via the conductor 90. The opposite side of relay coil 70 is connected with conductor 92 and this conductor is connected to one side of an engine speed responsive switch 94. The opposite side of the engine speed responsive switch is grounded.

The engine speed responsive switch 94 is a switch which is closed when the speed of the engine is below a predetermined value and opens when this speed is exceeded and then remains in an open position. The speed responsive switch 94 can be of a centrifugal type where it is mechanically driven and responds to engine speed or can be of a type which responds to engine oil pressure or engine fuel pressure. In each case, the switch 94 remains closed until the engine attains some predetermined speed whereupon it is opened and remains open until the engine speed drops below a predetermined value.

One side of the relay coil 68 is connected with the positive D.C. output terminal of the bridge rectifier 20 by a conductor 96. The opposite side of the relay coil 68 is connected with the A.C. input terminal 18 of the bridge rectifier 20 by a conductor 98. It will be appreciated that the junction 18 is located between a pair of diodes 22 and 24 as is clearly apparent from the drawing. If desired the conductor 96 can be connected with the negative grounded side 28 of the bridge rectifier 20 rather than to the positive side.

The conductor 32 which is connected with field winding 30 is connected to one side of a voltage regulator 100. The opposite side of the voltage regulator 100 is connected with conductor 101. The conductor 101 is connected with one side of battery 74 through conductor 103 whenever the relay contacts 105 of a relay 107 are closed. This relay has an actuating coil 109 connected between junction 84 and ground by conductor 102. The relay contacts 105 are normally open but will be closed whenever coil 109 is energized by the closing of switch 104. The voltage regulator 100 can take various forms and may be of the transistor type or could be of the vibrating contact type as long as the regulator is capable of controlling field current for the field winding 30 in response to the output voltage of the power source 10 all of which is well known to those skilled in the art.

A manually operable diesel engine control switch 104 is connected between conductor 72 and the junction 84 as is clearly apparent from the drawing.

The operation of the electrical system of this invention will now be described. When the operator desires to crank the engine 34 to start the engine, the manually operable switch 104 is closed. The closing of switch 104 causes relay contacts 105 to close providing a circuit for energizing the field winding 30 from the battery 74 which can be traced from the positive side of the battery, through conductor 103, through closed relay contacts 105, through conductor 101, through the voltage regulator 100, through conductor 32 and then through the field winding 30 to ground. This provides an initial energization for the field 30 of the power source 10 so that the generator will build up when it is rotatably driven by the engine 34.

When the driver closes the starter switch 88, the relay coil 70 is energized from junction 84, through the closed switch 88, through conductor 86, through relay coil 70, through conductor 92, and through the engine speed responsive switch 94 which is not closed since the engine is not running. With relay coil 70 energized, the armature 50 is pivoted counter-clock-wise so that the contact 58 now connects the contacts 64 and 66. This increases the air gap 106 between the top end of the core 68a of the relay 68 and the armature 50. With contacts 64 and 66 connected, the starting motor 36 is energized from the positive side of the battery 74, through the conductor 72, through the closed contacts 64 and 66, and then through the conductor 44 to the solenoid 38. This causes switch 40 to close to energize the starting motor. The engine will now be cranked by the starting motor 36 and the generator 10 will develop a D.C. output voltage. At this point, the relay coil 68 is energized by the potential appearing between junction 18 and the positive D.C. output terminal 26 of the bridge rectifier but the air gap 106 is too great to cause the armature 50 to be pulled toward the core 68a. This means that the voltage which is applied to the relay coil 68 from junction 18 cannot at this time cause the contact 56 to connect the contacts 60 and 62.

As soon as the engine starts, the speed responsive switch 94 moves to an open position which deenergizes the relay coil 70 since the circuit to ground is then opened. With relay coil 70 deenergized, the spring 52 together with the magnetic flux in air gap 106 are sufficient to cause the common armature 50 to pivot in a clock-wise direction to close the contacts 60 and 62. This movement of armature 50 completely deenergizes the starter 36 and performs two other switching functions. Thus when the contacts 60 and 62 are connected by the contact 56, the optional loads 81 can now be energized from conductor 78. In addition, the generator tell-tale lamp 82 is short circuited so that it goes out indicating that the generator has sufficient output voltage to charge the battery. It will be appreciated that the generator tell-tale lamp was previously energized from a circuit that can be traced from the positive side of battery 74, through conductor 72, through the closed switch 104, through junction 84, through the tell-tale lamp 82, through junction 76 and through the resistor 80 to ground.

While the embodiments of the present invention as herein disclosed, constitute a preferred form, it is to be understood that other forms might be adopted.

What is claimed is as follows:

1. An electrical system for a motor vehicle having an engine comprising, an electric cranking motor for cranking said engine, a control relay having an armature and first and second coil windings, a switch means responsive to engine speed, a source of direct current potential, a generator driven by said engine, first and second switch means controlled by movement of the armature of said control relay, a circuit for energizing said electric starting motor from said battery including said first switch means of said control relay, a circuit controlled by said second switch means of said control relay for supplying an external electrical load from said source of direct current potential, a circuit for energizing said first coil winding of said control relay including a manually operable switch and said engine speed responsive switch means, and means connecting said second coil winding of said control relay in circuit with said generator, the output voltage of said generator being insufficient to move said common armature of said control relay when said first coil winding of said control relay is energized.

2. In combination, an engine, an electric cranking motor for cranking said engine, a source of direct current, a first switch means responding to a condition of operation of said engine, a generator driven by said engine, a control means including second and third switch means, said control means having first and second electromagnets, the magnetic flux of said first electromagnet operating to close said second switch means and open said third switch means and the magnetic flux of said electromagnet being operative to close said third switch means and open said second switch means, a circuit for energizing said electric cranking motor controlled by said second switch means, a generator tell-tale lamp, a circuit controlling the energization of said generator tell-tale lamp including said third switch means, means connecting said first electromagnet in circuit with said first switch means, and means connecting said second electromagnet with said generator.

3. The combination according to claim 2 wherein the third switch means also controls a circuit that supplies an electrical load from said source of direct current.

4. The combination according to claim 2 wherein the generator has a three phase output winding which is connected with a three phase full wave bridge rectifier network and wherein the second electromagnet is connected across one of the diodes of the bridge rectifier network.

5. In combination, an engine, an electric cranking motor for cranking said engine, a source of direct current, a control relay having an armature, and first and second coil windings, first and second switch means controlled by movement of said armature, said first switch means being closed and said second switch means opened by movement of said armature when said first coil winding is energized, said second switch means being closed and said first switch means opened when said second coil winding is energized, said second coil winding being incapable of moving said armature in one direction when said first coil winding is energized and said first switch means is closed, means connecting said first switch means between said source of direct current and said electric cranking motor, an electrical load, means connecting said second switch means in circuit with said source of direct current and in circuit with said electrical load, a generator driven by said engine, a third switch means responsive to a condition of operation of said engine, said third switch means controlling the energization of said first coil winding, and means connecting said generator with said second coil winding.

6. The combination according to claim 5 wherein a circuit for the first coil winding is provided which includes a manually operable switch.

7. The combination according to claim 5 wherein said second switch means controls a circuit for a generator telltale lamp.

8. The combination according to claim 5 wherein the generator is an alternating current generator which is connected with a three phase full wave bridge rectifier network and wherein said second relay coil is connected across one of the diodes of said bridge rectifier network.

References Cited by the Examiner
UNITED STATES PATENTS

| 1,932,979 | 10/1933 | Maurer | 290—37 |
| 1,959,861 | 5/1934 | Gillen | 290—37 |
| 1,979,302 | 11/1934 | Whitney | 290—37 X |
| 1,983,783 | 12/1934 | Bertsche | 290—37 X |
| 2,004,053 | 6/1935 | Loehr et al. | |

ORIS L. RADER, *Primary Examiner.*

MILTON O. HIRSHFIELD, *Examiner.*

G. SIMMONS, *Assistant Examiner.*